United States Patent
Borst et al.

(10) Patent No.: US 6,366,668 B1
(45) Date of Patent: Apr. 2, 2002

(54) METHOD OF ROUTING CALLS IN AN AUTOMATIC CALL DISTRIBUTION NETWORK

(75) Inventors: Simon C. Borst, Convent Station, NJ (US); Andrew D. Flockhart, Thornton, CO (US); Francis C. Hymus, Bridgewater, NJ (US); Eugene P. Mathews, Barrington, IL (US); Martin I. Reiman, Maplewood, NJ (US); Judith B. Seery, Madison, NJ (US); John Z. Taylor, Bedminster, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/266,283

(22) Filed: Mar. 11, 1999

(51) Int. Cl.[7] .................................................. H04M 3/00
(52) U.S. Cl. ............................ 379/266.04; 379/265.11; 379/221.01
(58) Field of Search .................................. 379/265, 266, 379/309, 201, 209, 221

(56) References Cited

U.S. PATENT DOCUMENTS

| | | | | |
|---|---|---|---|---|
| 5,253,288 A | * | 10/1993 | Frey et al. | 379/201 X |
| 5,530,744 A | * | 6/1996 | Charalambous et al. | 379/112 |
| 5,740,238 A | | 4/1998 | Flockhart et al. | 379/221 |
| 5,754,639 A | | 5/1998 | Flockhart et al. | 379/221 |
| 6,169,904 B1 | * | 1/2001 | Ayala et al. | 455/445 X |

* cited by examiner

Primary Examiner—Creighton Smith
(74) Attorney, Agent, or Firm—David Volejnicek (57) ABSTRACT

The alternate destination redirection (ADR) feature (102) of telephone switching systems (101) or an equivalent is used to implement a "post-route" routing architecture having the benefits of a "pre-route" routing architecture in a network ACD (FIG. 1). The ADR feature is administered in the network (100) for individual ACD systems and individual call types at each ACD system to identify another ACD system as an alternative destination for calls of the individual call type rejected by the individual ACD system. The network distributes (302) calls to the plurality of ACD systems (110–112) on a basis (e.g., fixed percentage, round-robin) that does not require the network to know the status of the individual ACD systems. Upon having a call of an individual type routed thereto, an individual ACD system checks (304) the status of the ACD system that is administered as the alternative destination for its rejected calls of the individual type. If it determines that it can provide the better service, the individual ACD system services (314) the call. If it determines that the alternative destination ACD system can provide the better service, the individual ACD system rejects (308) the call, whereupon the network, operating under influence of the ADR feature, releases (310) the connection of the call to the individual ACD system and reroutes (312) the call to the alternative destination ACD system.

21 Claims, 6 Drawing Sheets

METHOD OF ROUTING CALLS IN AN AUTOMATIC CALL DISTRIBUTION NETWORK

TECHNICAL FIELD

This invention pertains generally to automatic call distribution (ACD) systems, also known as call centers or telemarketing systems, and specifically to the routing of calls among such systems in a network of such systems.

BACKGROUND OF THE INVENTION

"Network ACD" refers to a plurality of ACD systems that are 10 interconnected with each other (networked) by a—typically the public telephone—communications network. There are two main types of network ACD routing architectures in use. One is a "pre-route" or "network-route" architecture, which makes routing decisions while the call is still in the interconnecting (e.g., public telephone) network. With this architecture, it is difficult for the routing node to obtain timely information on the status of the individual ACDs in order to make a good routing decision. However, this architecture has the advantage that it does not use telecommunications links (e.g., telephony trunks) to route a call to the destination ACD beyond those that would be used to complete a regular, non-ACD, call. The other architecture is a "post-route" or "premises-route" architecture, which makes routing decisions after the call has been delivered to an ACD system. With this architecture, very high-quality routing decisions can be made by the receiving ACD. Unfortunately, the re-routing of the call to different ACDs in the network requires the use of additional communications links—those required to connect the call from the receiving ACD to the destination ACD. This use of additional network resources to complete the call is undesirable. The ideal solution would be to make high-quality routing decisions without the need to use additional network resources for routing the call.

SUMMARY OF THE INVENTION

This invention is directed to solving these and other problems and disadvantages of the prior art. Illustratively according to the invention, the alternate destination redirection (ADR) feature of telephone switching systems (also known as the alternate destination call redirection, or ADCR) or an equivalent is used to implement a "post-route" routing architecture having the benefits of a "pre-route" routing architecture in a network ACD. The ADR feature is administered in the network, for individual ACD systems and individual call types at each ACD system, to identify another ACD system as the alternative destination for calls of the individual call type rejected by the individual ACD system. The network distributes calls to the plurality of ACD systems on a basis (e.g., fixed percentage, round-robin) that does not require the network to know the status of the individual ACD systems. Upon having a call of an individual type routed thereto, an individual ACD system checks the status of the ACD system that is administered as the alternative destination for its rejected calls of the individual type. If it determines that it can provide the better service, the individual ACD system services the call. If it determines that the alternative destination ACD system can provide the better service, the individual ACD system rejects the call, whereupon the network, operating under influence of the ADR feature, releases the connection of the call to the individual ACD system and reroutes the call to the alternative destination ACD system.

Generally according to the invention, routing of communications to ACD systems in a network of a plurality of ACD systems interconnected by a communications network is effected as follows. The communications network routes a communication to a selected one of the plurality of ACD systems. In response to having the communication routed thereto, the selected ACD system determines whether or not it will service the communication, by checking the status of the other ACD system and determining therefrom whether it or the other ACD system can provide better service to the communication. In response to determining that it will not service the communication, the selected ACD system sends a rejection (e.g., a "busy" indication) to the communications network. In the communications network, the other ACD system is identified (e.g., administered in the ADR feature or the equivalent) as the alternative destination for the communication rejected by the selected ACD system. Therefore, in response to receiving the rejection, the communications network releases a connection of the communication to the selected ACD system and reroutes the communication to the other ACD system.

The invention incorporates the advantages of both pre-route and post-route architectures without the disadvantages of each. That is, it makes high-quality routing decisions without the need for additional trunking. It is also lower in cost than both traditional types of network ACD routing architectures: it does not have the capital costs for network servers and gateways that are incurred with pre-route architectures, and it does not have the extra trunking costs incurred by post-route architectures. Furthermore, for ACD systems that already have the capability to determine the status of other ACD systems, it requires no hardware changes or software development to implement—proper administration of the ACD systems and of the network is all that is required.

These and other advantages and features of the invention will become more apparent from the following description of an illustrative embodiment of the invention considered together with the drawing.

DETAILED DESCRIPTION

Figure 1:
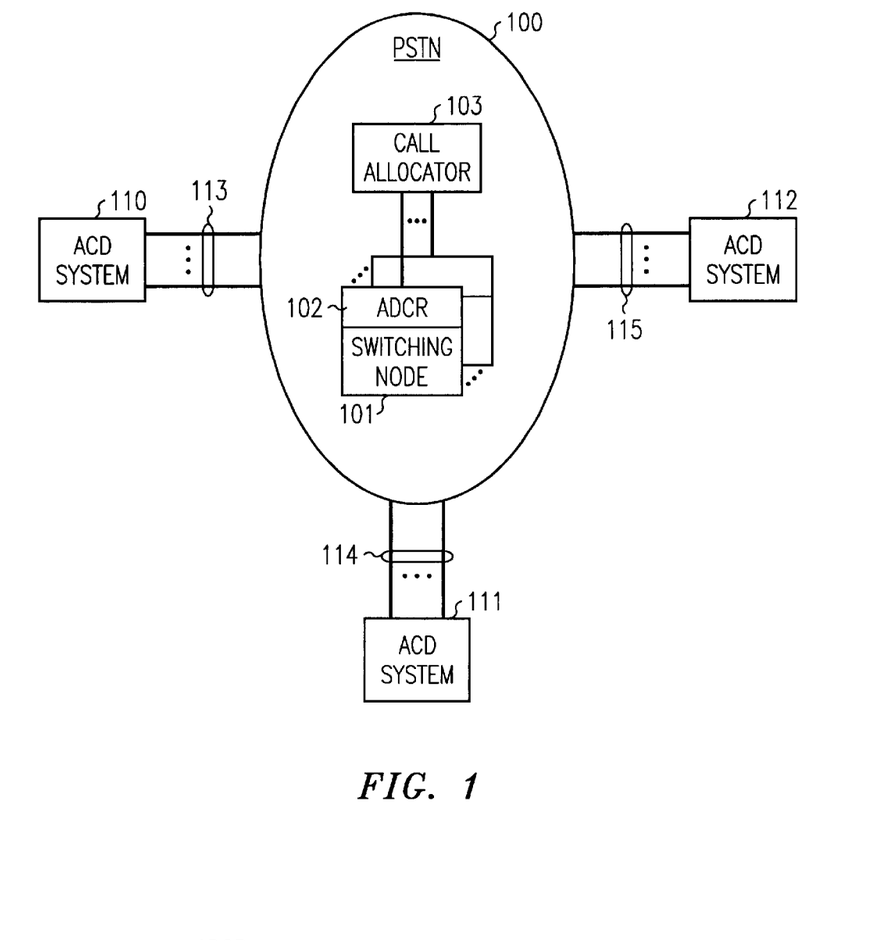
FIG. 1 is a block diagram of a network ACD that includes an illustrative embodiment of the invention.

FIG. 1 shows an illustrative network ACD which comprises a plurality of ACD systems 110–112 interconnected (networked) with each other and with calling and/or called parties via the public switched telephone network (PSTN) 100, the Internet, or some other communications network. Illustratively, ACD systems 110–112 are connected to PSTN 100 via trunks 113–115, which preferably are ISDN trunks. PSTN 100 includes one or more conventional switching nodes 101 for routing communications (e.g., calls) to their destinations, which in this case are the ACD systems 110–112. PSTN 100 further includes a conventional call allocator 103, which is a stored-program-controlled machine that tells switching nodes 101 which ACD calls to route to which one of ACD systems 110–112.

Figure 2:
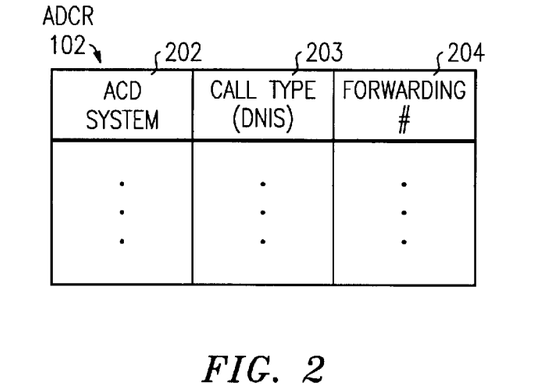
FIG. 2 is a block diagram of data entries of an ADR feature of a switching node of the network ACD of FIG. 1.

Switching nodes 101 of PSTN 100 conventionally provide the Alternate Destination Redirection (ADR) feature 102, or an equivalent. As shown in FIG. 2, this feature allows a single forwarding number 204 to be administered in a switching node 101 for each call type (e.g., called number, or DNIS) 203 for each ACD system 110–112 served by that switching node 101. When a switching node 101 delivers a call to the destination identified by the called number and the destination replies with a "busy", the switching node 101 releases the call connection to the destination and reroutes the call to the call type's (called number's) 5 forwarding number specified for that destination.

Figure 3:
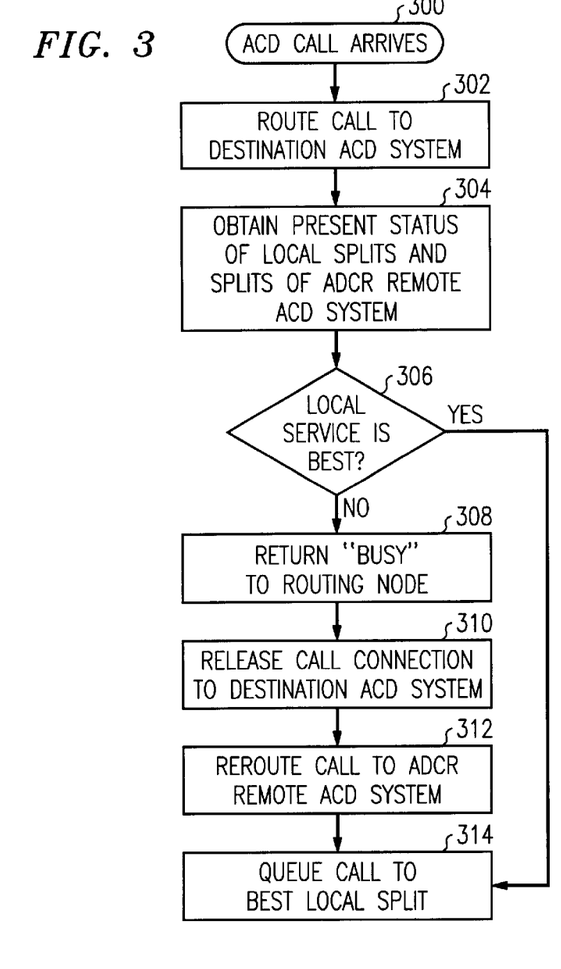
FIG. 3 is a functional flow diagram of operations performed by the network ACD of FIG. 1 to route a call to an appropriate ACD system.
Figure 4:
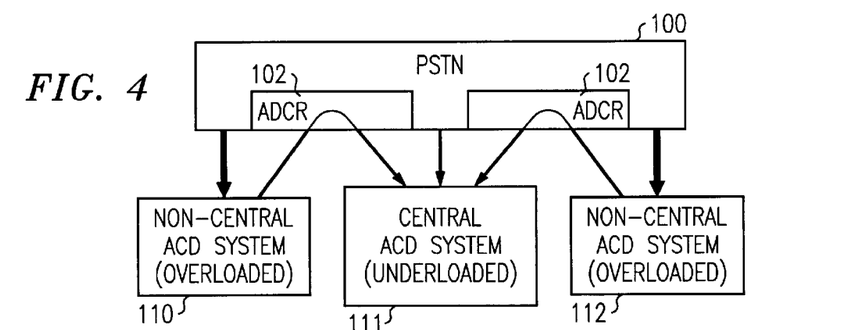
FIGS. 4–11 are each a block diagram of an alternative embodiment of the invention in the network ACD of FIG. 1.

According to the invention, the ADR feature 102 or an equivalent is used to achieve the advantages of both pre-route and post-route network ACD architectures without suffering the disadvantages of either architecture. This is illustratively accomplished as follows. Call allocator 103 is administered to operate without obtaining status information from ACD systems 110–112, and to simply route a percentage of calls of each call type to each ACD system 110–112. One of the ACD systems 110–112, generally the one with the greatest number of agents for handling calls of a call type, is denoted as a "central" ACD system 111 for that call type, and call allocator 103 is administered to deliberately underload the central ACD system 111 and to overload the other ACD systems 110 and 112 with calls of this type. As a result, there will be a constant need to redirect a small percentage of calls of this type from each non-central, or primary, ACD system 110 and 112 to the central, or backup, ACD system 111 in order to maintain an even load-balance across the network. This redirection is provided by the ADR feature 102, which is administered for each call type (e.g., each DNIS) for each non-central ACD system to redirect calls of that type to the central ACD system. When a call of a particular type is routed to the central ACD system for that call type, the call is simply queued to the appropriate split. But, as shown in FIG. 3, when a call of that type arrives, at step 300, and is routed to a non-central ACD system for that call type, at step 302, a post-route arrangement (such as is described in U.S. Pat. No. 5,754,639, for example) is used by that non-central ACD system to compare the status of its splits with the status of the splits of the central ACD system, at step 304. If the non-central ACD system can offer a better service than the central ACD system, as determined at step 306, the call is simply queued to the appropriate split and is serviced at the non-central ACD system, at step 314. If the central ACD system can offer a better service than this non-central ACD system, as determined at step 306, a rejection (e.g., a "busy" signal) is immediately returned by the non-central ACD system to a switching node 101, at step 308, which triggers the ADR feature 102. This feature causes switching node 101 to release the call connection to this non-central ACD system, at step 310, and to reroute the call to the designated alternate destination, which in this example is the central ACD system, at step 312. At the central ACD system, the rerouted call is queued to the appropriate split, at step 314. The just-described embodiment of the invention is shown for one call type in FIG. 4.

Figure 5:
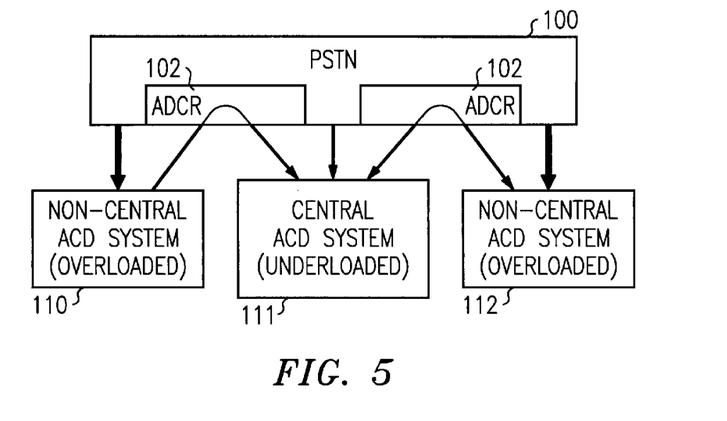

Alternatively, the central ACD system 111 may function just like one of the non-central ACD systems 110 and 112 as shown in FIG. 3, by comparing its service quality with and forwarding its excess calls to one—typically the largest one—of the non-central ACD systems 110 and 112. This alternative is shown for one call type in FIG. 5.

Figure 6:
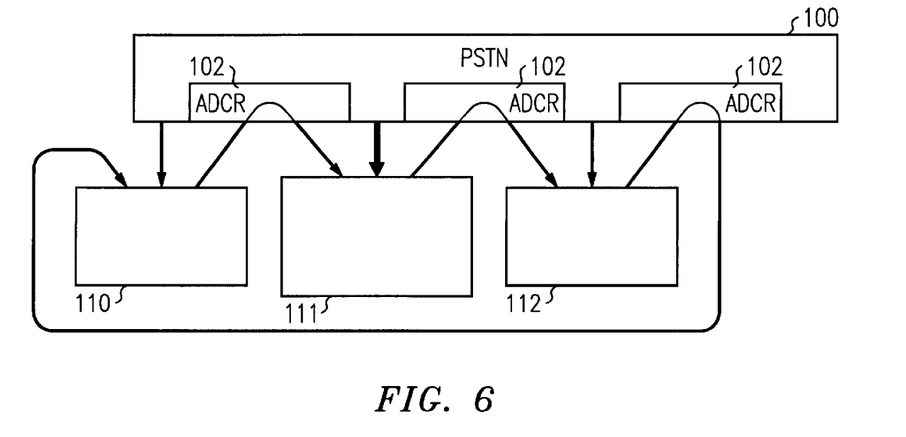

Another alternative embodiment, found to be particularly useful when all ACD systems 110–112 are of approximately the same size, eliminates the concept of a central ACD system and treats all ACD systems equally, as non-central ACD systems connected in a ring. Call allocator 103 is programmed to perform round-robin routing of calls to ACD systems 110–112, whereby they are all equally loaded with calls, and the ADR feature 102 of switching nodes 101 and the post-route arrangements of the ACD systems 110–112 are administered such that each ACD system 110–112 compares its service against, and forwards excess calls to, a different one of the other ACD systems 110–112. This embodiment is shown for one call type in FIG. 6.

Figure 7:
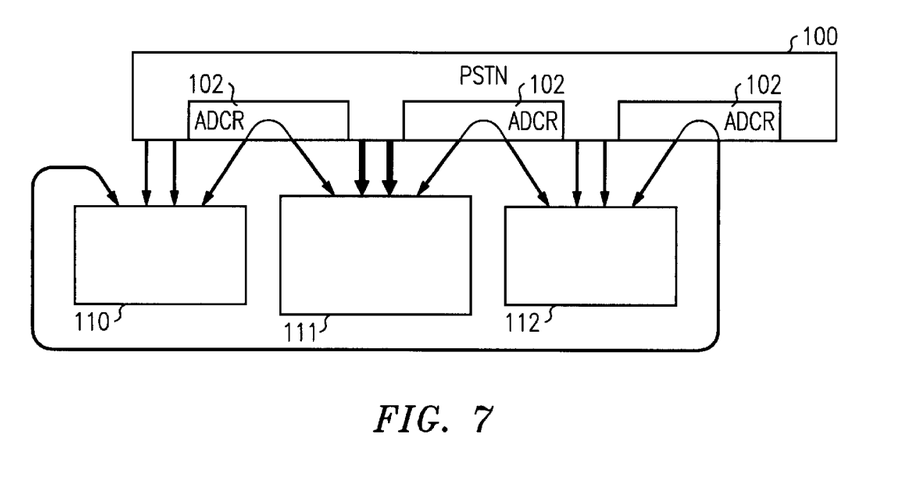

Yet another alternative embodiment causes calls of the same type that are being routed to a primary ACD system 111 to be delivered to that ACD system 111 in multiple streams (e.g., to different DNISs), and primary ACD system 111 has a different one of ACD system 110 and 112 administered in ADR feature 102 of switching node 101 as the backup system for each of the multiple streams. This embodiment is shown for one call type in FIG. 7.

Figure 8:
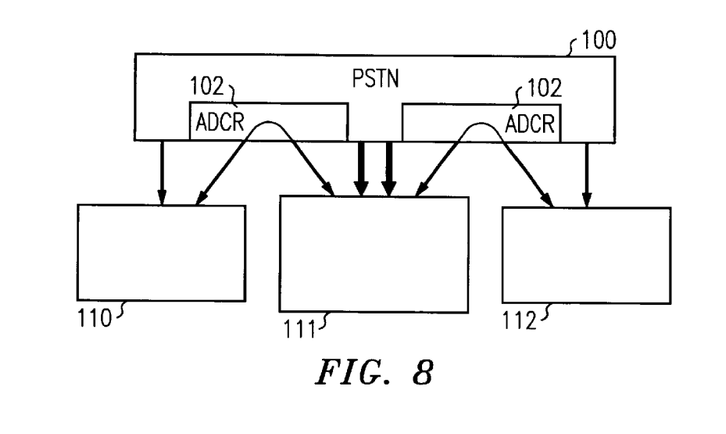

Not all of the streams need be of the same size (the same number of calls.) For example, the streams may be sized proportionally to the relative sizes of the backup ACD systems for the corresponding streams. Also, not all of the ACD systems need employ multiple streams; for example, only one of the ACD systems 111 may employ multiple streams while each of the other ACD systems 110 and 112 employs a single stream for each call type. This variant is shown for one call type in FIG. 8.

The described architecture is extendable to network ACDs with large numbers of ACD systems 110–112 and 910–912 where the network ACD is divided into a plurality of sub-networks 900 and 901, each with its own central ACD system 111 and 911, respectively. Call loads are balanced across the sub-networks 900 and 901 by connecting each central ACD system 111, 911 to the other ACD systems 110 and 112, 910 and 912, respectively, in its sub-system 900, 901, respectively, in the manner shown in one of the FIGS. 4–8, and by connecting together the two central ACD systems 111 and 911 to compare their service with, and to route excess calls to, one another. This embodiment is shown for one call type in FIG. 9.

Figure 9:
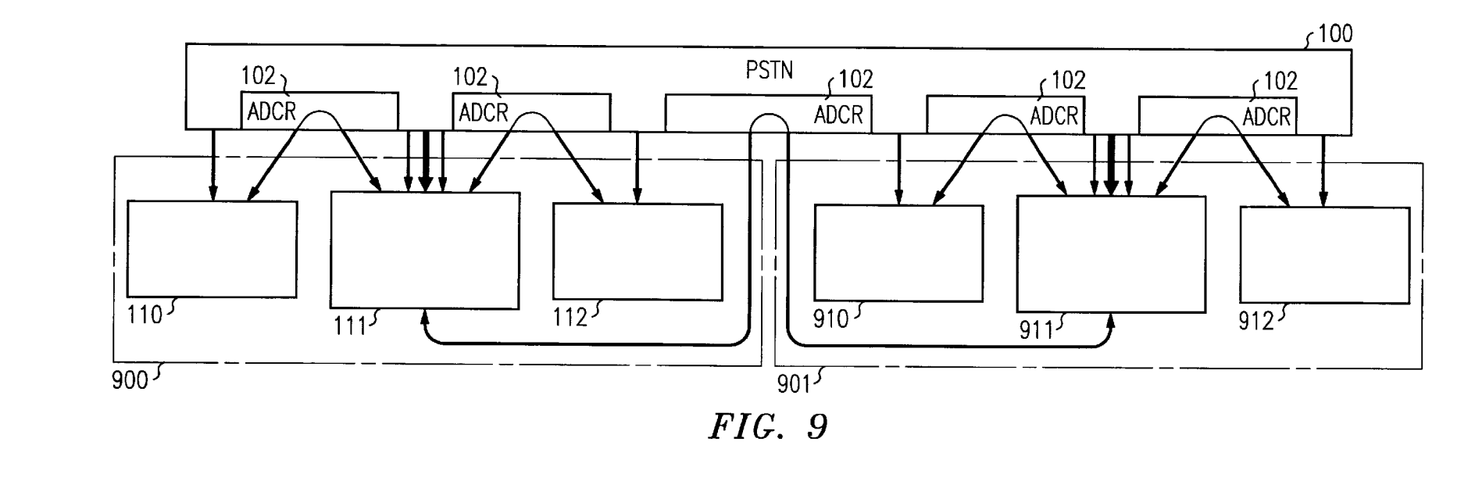
Figure 10:
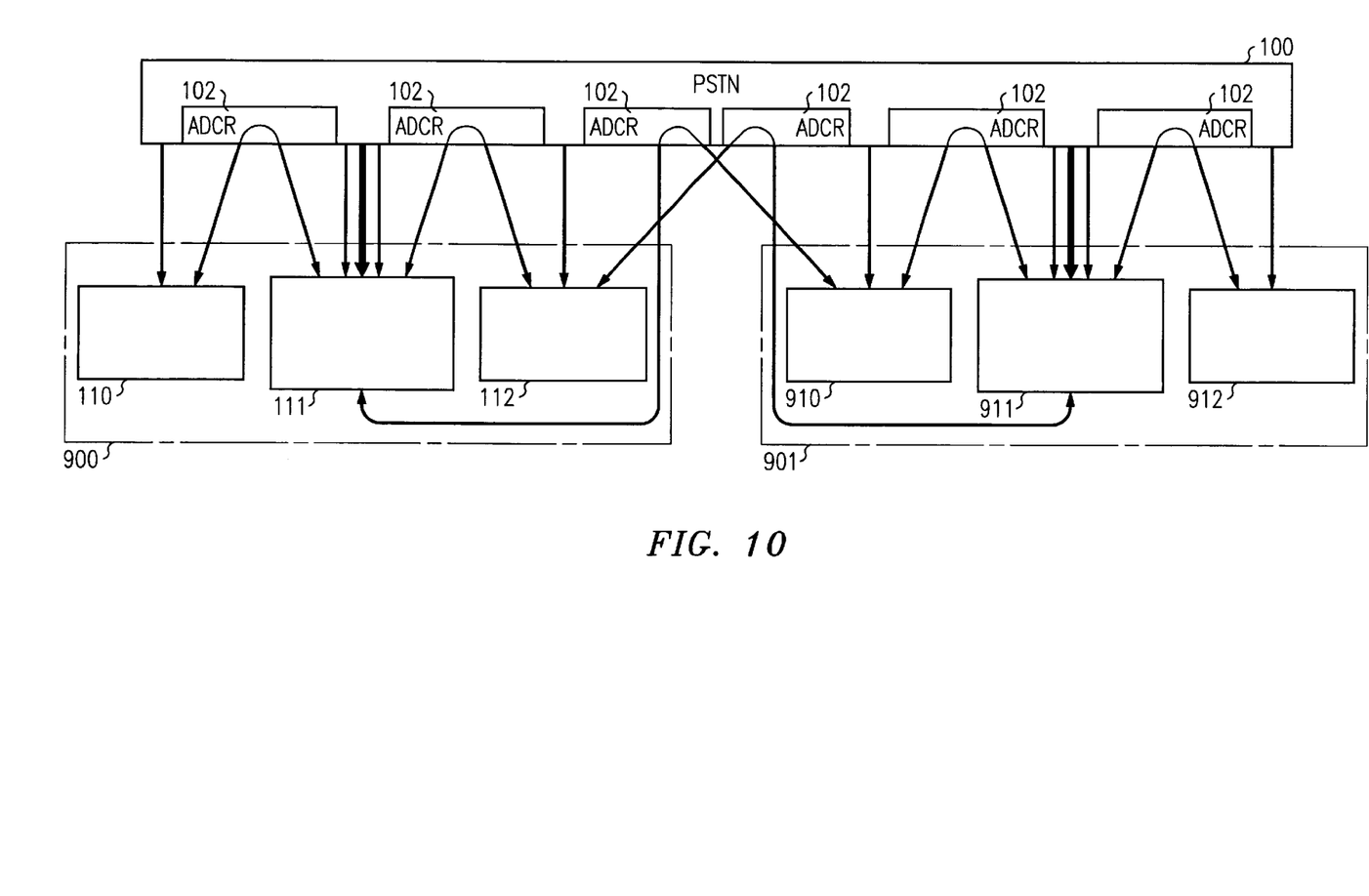

A variation on the embodiment of FIG. 9 involves the two central ACD systems 111 and 911 comparing their service with, and routing excess calls to, one of the non-central ACD systems 912 and 110, respectively, of the other sub-system. This variation is shown for one call type in FIG. 10.

Figure 11:
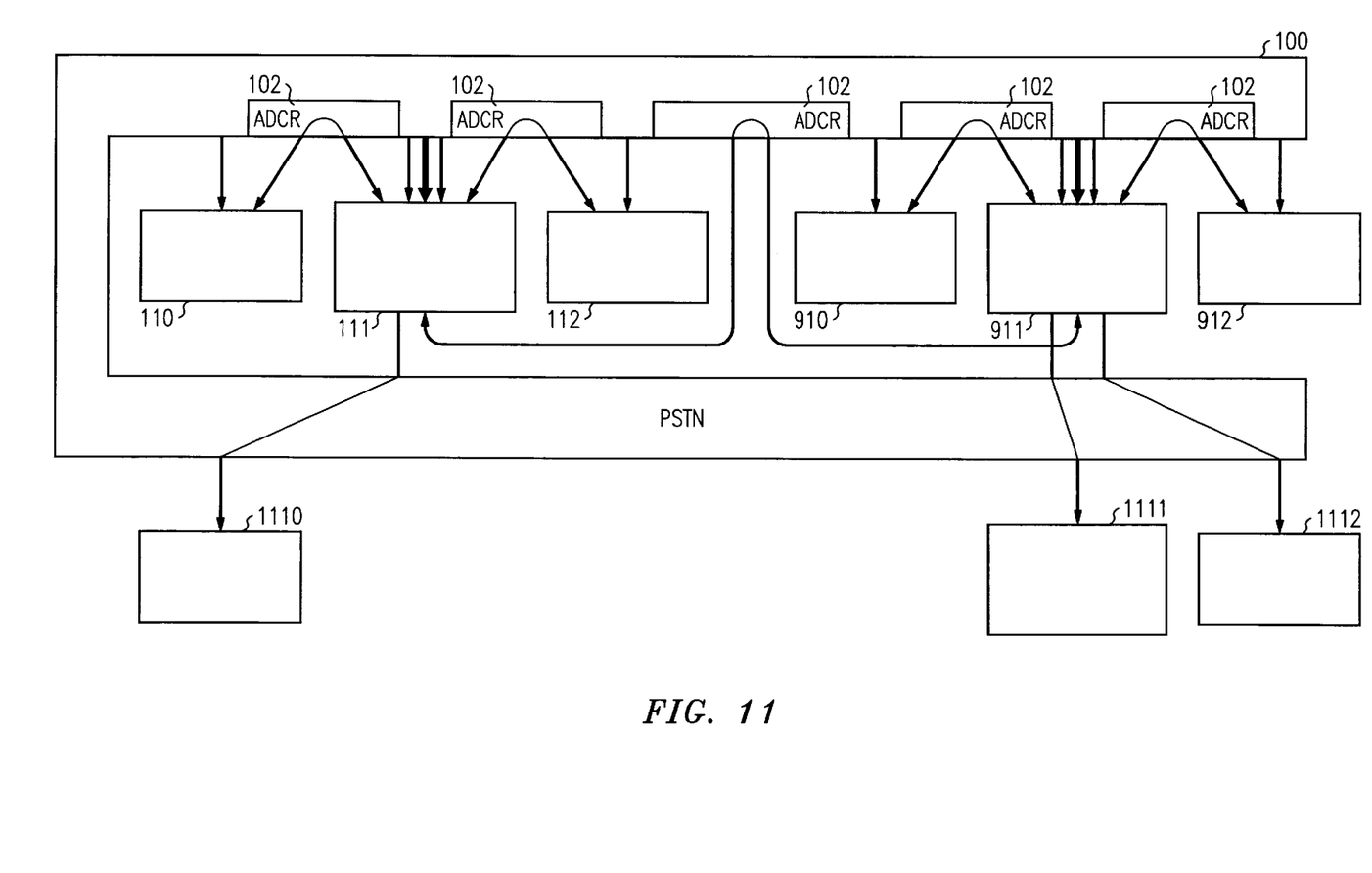

In a network ACD comprising ACD systems of greatly varying sizes, including very small ACD systems 1110–1112 where accurate service predictions are difficult, the lookahead interflow (LAI) of ACD systems such as the Lucent Definity® ACD system may be used to deliver calls to the very small ACD systems 1110–1112. This configuration is an extension of the configuration of FIG. 9, and is shown in FIG. 11. The small ACD systems 1110–1112 do not receive incoming calls directly from the network 100; rather, calls are redirected from central ACD systems 111 and 911 to the small ACD systems 1110–1112 using LAI when an agent becomes available at the small ACD systems 1110–1112. Although the calls redirected to the small ACD systems 1110–1112 via LAI do require additional call trunks, this accounts for a very small percentage of the total number of calls.

Of course, various changes and modifications to the illustrative embodiments described above will be apparent to those skilled in the art. For example, instead of receiving status-indicative messages from a backup ACD system, a primary ACD system may merely check whether the backup ACD system is presenting a "busy" indication to arriving calls, and use this as the criterion for determining whether it or the backup ACD system can provide the better service. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of routing communications to ACD systems in a network of a plurality of ACD systems interconnected by a communications network, comprising:

the communications network routing a first communication to a selected one of the plurality of ACD systems;

in response to having the communication routed thereto, the selected ACD system checking status of another one of the plurality of ACD systems to determine whether or not the selected ACD system will service the first communication;

in response to determining that the selected ACD system will not service the first communication, the selected ACD system sending a rejection to the communications network;

in response to receiving the rejection, the communications network releasing a connection of the first communication to the selected ACD system; and further in response to receiving the rejection, the communications network rerouting the first communication to the other ACD system, which is identified in the communications network as an alternative destination for the first communication rejected by the selected ACD system.

2. The method of claim 1 wherein:

checking status comprises determining from the status which one of the selected ACD system and the other ACD system can provide better service to the communication.

3. The method of claim 1 wherein:

checking status comprises receiving a status-indicative message from the other ACD system.

4. The method of claim 1 wherein:

checking status comprises determining whether the other ACD system is presenting a busy indication to communications.

5. The method of claim 1 wherein:

the communications network routes a first plurality of communications to the selected ACD system which overloads the selected ACD system, and routes a second plurality of communications to the other ACD system which underloads the other ACD system, so that the other ACD system has capacity to service communications rerouted thereto from the selected ACD system.

6. The method of claim 1 wherein:

the first communication is of a first type; and the method further comprises the communications network routing a second communication, of a second type, to the selected ACD system, in response to having the second communication routed thereto, the selected ACD system checking status of a third one of the plurality of ACD systems to determine whether or not the selected ACD system will service the second communication, in response to determining that the selected ACD system will not service the second communication, the selected ACD system sending a rejection of the second communication to the communications network, in response to receiving the rejection of the second communication, the communications network releasing a connection of the second communication to the selected ACD system, and further in response to receiving the rejection of the second communication, the communications network rerouting the second communication to the third ACD system, which is identified in the communications network as an alternative destination for communications of the second type rejected by the selected ACD system.

7. The method of claim 6 further comprising:

administering the communications network to indicate, for each type of communications, an alternative destination ACD system for servicing communications of that type rejected by the selected ACD system.

8. The method of claim 7 wherein:

administering comprises administering an alternate destination redirection (ADR) feature, or an equivalent, of a switching system of the communications network.

9. The method of claim 8 wherein:

sending a rejection comprises sending a busy indication.

10. The method of claim 6 further comprising:

the communications network routing some communications, including a third communication of the first type and a fourth communication of the second type, to the other ACD system, and routing other communications, including a fifth communication of the first type and a sixth communication of the second type, to the third ACD system;

in response to having the third or the fourth communication routed thereto, the other ACD system determining whether or not the other ACD system will service the third or the fourth communication;

in response to determining that the other ACD system will not service the third or the fourth communication, the other ACD system sending a rejection of the third or the fourth communication to the communications network;

in response to having the fifth or the sixth communication routed thereto, the third ACD system determining whether or not the third ACD system will service the fifth or the sixth communication;

in response to determining that the third ACD system will not service the fifth or the sixth communication, the third ACD system sending a rejection of the fifth or the sixth communication to the communications network;

in response to receiving any one of the rejections from the second or the third ACD, the communications network releasing a connection of the rejected communication to the ACD system to which the connection connects;

further in response to receiving the rejection of the third or the fifth communication, the communications network rerouting the third or the fifth communication to the selected ACD system, which is identified in the communications network as an alternative destination for communications of the first type rejected by the other ACD system and by the third ACD system;

further in response to receiving the rejection of the fourth communication, the communications network rerouting the fourth communication to the third ACD system, which is identified in the communications network as an alternative destination for communications of the second type rejected by the other ACD system; and further in response to receiving the rejection of the sixth communication, the communications network rerouting the sixth communication to the other ACD system, which is identified in the communications network as an alternative destination for communications of the second type rejected by the third ACD system.

11. The method of claim 1 wherein:

determining comprises the selected ACD system obtaining information from the other ACD system regarding service that the communication would receive at the other ACD system, comparing the service that the communication would receive at the other ACD system with service that the communication would receive at the selected ACD system, and in response to determining that the communication would receive better service at the other ACD system, sending the rejection to the communications network.

12. The method of claim 1 further comprising:

the communications network routing a second communication to the other ACD system and routing a third communication to a third one of the plurality of ACD systems;

in response to having the third communication routed thereto, the third ACD system determining whether or not the third ACD system will service the third communication;

in response to determining that the third ACD system will not service the third communication, the third ACD system sending a rejection of the third communication to the communications network;

in response to receiving the rejection of the third communication, the communications network releasing a connection of the third communication to the third ACD system;

further in response to receiving the rejection of the third communication, the communications network rerouting the third communication to the other ACD system, which is identified in the communications network as an alternative destination for the third communication rejected by the third ACD system; and in response to having the second communication routed thereto and having the first and the third communications rerouted thereto, the other ACD system servicing the first, the second, and the third communications.

13. The method of claim 12 wherein:

the communications network routes a first stream of first communications to the selected ACD system which overloads the selected ACD system, routes a second stream of second communications to the other ACD system which underloads the other ACD system, and routes a third stream of third communications to the third ACD system which overloads the third ACD system.

14. The method of claim 12 further comprising:

the communications network routing a fourth communication to the other ACD system;

in response to having the fourth communication routed thereto, the other ACD system determining whether or not the other ACD system will service the fourth communication;

in response to determining that the other ACD system will not service the fourth communication, the other ACD system sending a rejection of the fourth communication to the communications network;

in response to receiving the rejection of the fourth communication, the communications network releasing a connection of the fourth communication to the other ACD system; and further in response to receiving the rejection of the fourth communication, the communications network rerouting the fourth communication to the selected ACD system, which is identified in the communications network as an alternative destination for the fourth communication rejected by the other ACD system.

15. The method of claim 14 further comprising:

the communications network routing a fifth communication to the other ACD system;

in response to having the fifth communication routed thereto, the other ACD system determining whether or not the other ACD system will service the fifth communication;

in response to determining that the other ACD system will not service the fifth communication, the ACD system sending a rejection of the fifth communication to the communications network;

in response to receiving the rejection of the fifth communication, the communications network releasing a connection of the fifth communication to the other ACD system; and further in response to receiving the rejection of the fifth communication, the communications network rerouting the fifth communication to the third ACD system, which is identified in the communications network as an alternative destination for the fifth communication rejected by the other ACD system.

16. The method of claim 15 wherein:

the communications network routes a stream of fourth communications and a stream of fifth communications to the other ACD system and relative sizes of the streams of fourth and fifth communications are proportional to relative capacities of the selected and the third ACD systems to service communications.

17. The method of claim 1 further comprising:

the communications network routing a second communication to the other ACD system and routing a third communication to a third one of the plurality of ACD systems;

in response to having the third communication routed thereto, the third ACD system determining whether or not the third ACD system will service the third communication;

in response to determining that the third ACD system will not service the third communication, the third ACD system sending a rejection of the third communication to the communications network;

in response to receiving the rejection of the third communication, the communications network releasing a connection of the third communication to the third ACD system;

further in response to receiving the rejection of the third communication, the communications network rerouting the third communication to the other ACD system, which is identified in the communications network as an alternative destination for the third communication rejected by the third ACD system;

in response to having the second communication routed thereto, the other ACD system determining whether or not the other ACD system will service the second communication;

in response to determining that the other ACD system will not service the second communication, the other ACD system sending a rejection of the second communication to the communications network;

in response to receiving the rejection of the second communication, the communications network releasing a connection of the second communication to the other ACD system;

further in response to receiving the rejection of the second communication, the communications network rerouting the second communication to the third ACD system, which is identified in the communications network as an alternative destination for the second communication rejected by the other ACD system.

18. The method of claim 1 further comprising:

the communications network routing a second communication to the other ACD system and routing a third communication to a third one of the plurality of ACD systems;

in response to having the second communication routed thereto, the other ACD system determining whether or not the other ACD system will service the second communication;

in response to determining that the other ACD system will not service the one communication, the other ACD system sending a rejection of the second communication to the communications network;

in response to receiving the rejection of the second communication, the communications network releasing a connection of the second communication to the other ACD system;

further in response to receiving the rejection of the second communication, the communications network rerouting the second communication to the third ACD system, which is identified in the communications network as an alternative destination for the second communication rejected by the other ACD system;

in response to having the third communication routed thereto, the third ACD system determining whether or not the third ACD system will service the third communication;

in response to determining that the third ACD system will not service the third communication, the third ACD system sending a rejection of the third communication to the communications network;

in response to receiving the rejection of the third communication, the communications network releasing a connection of the third communication to the third ACD system; and further in response to receiving the rejection of the third communication, the communications network rerouting the third communication to the selected ACD system, which is identified in the communications network as an alternative destination for the third communication rejected by the third ACD system.

19. The method of claim 1 further comprising:

the communications network routing a second communication of a first type and a third communication of a second type to the other ACD system, and routing a fourth communication to a third one of the plurality of ACD systems;

in response to having the second or the third communication routed thereto, the other ACD system determining whether or not the other ACD system will service the second or the third communication;

in response to determining that the other ACD system will not service the second or the third communication, the other ACD system sending a rejection of the second or the third communication to the communications network;

in response to having the fourth communication routed thereto, the third ACD system determining whether or not the third ACD system will service the fourth communication;

in response to determining that the third ACD system will not service the fourth communication, the third ACD system sending a rejection of the fourth communication to the communications network;

in response to receiving the rejection of the second, the third, or the fourth communication, the communications network releasing a connection of the rejected communication to the ACD system to which the connection connects;

further in response to receiving the rejection of the second communication, the communications network rerouting the second communication to the selected ACD system, which is identified in the communications network as an alternative destination for communications of the first type rejected by the other ACD system;

further in response to receiving the rejection of the third communication, the communications network rerouting the third communication to the third ACD system, which is identified in the communications network as an alternative destination for communications of the second type rejected by the other ACD system; and further in response to receiving the rejection of the fourth communication, the communications network rerouting the fourth communication to the other ACD system, which is identified in the communications network as an alternative destination for communications rejected by the third ACD system.

20. The method of claim 1 further comprising:

the communications network routing individual communications to different ones of a first plurality of the ACD systems that includes the selected and the other ACD systems;

in response to having an individual communication routed thereto, an individual ACD system of the first plurality determining whether or not the individual ACD system will service the individual communication;

in response to determining that the individual ACD system will not service the individual communication, the individual ACD system sending a rejection to the communications network;

in response to receiving a rejection of an individual communication from an individual ACD system, the communications network releasing a connection of the individual communication from the individual ACD system; and further in response to receiving the rejection of the individual communication from the individual ACD system, the communications network rerouting the individual communication to a particular one of the first plurality of ACD systems which is identified in the communications network as an alternative destination for the individual communication rejected by the individual ACD system.

21. The method of claim 20 wherein:

routing individual communications comprises the communications network routing individual communications, including a communication of a first type and a communication of a second type, to the other ACD system; and rerouting the individual communication comprises further in response to receiving the rejection of the individual communication from the individual ACD system of the first plurality, other than the rejection of the communication of the second type from the other ACD system, the communications network rerouting the individual communication, other than the communication of the second type, to a particular one of the first plurality of ACD systems which is identified in the communications network as an alternative destination for the individual communication rejected by the individual ACD system of the first plurality, other than for the communication of the second type rejected by the other ACD system, and further in response to receiving the rejection of the individual communication of the second type from the other ACD system, the communications network rerouting the individual communication of the second type to a particular one of a second plurality of ACD systems that excludes the first plurality, which is identified in the communications network as an alternative destination for the individual communication of the second type rejected by the other ACD system; and the method further comprises the communications network routing individual communications to different ones of the second plurality of the ACD systems, including routing a communication of the first type and a communication of the second type to a third ACD system of the second plurality, in response to having an individual communication routed thereto, an individual ACD system of the second plurality determining whether or not the individual ACD system will service the individual communication, in response to determining that the individual ACD system will not service the individual communication, the individual ACD system of the second plurality sending a rejection to the communications network, in response to receiving a rejection of an individual communication from an individual ACD system of the second plurality, the communications network releasing a connection of the individual communication to the individual ACD system of the second plurality, further in response to receiving the rejection of the individual communication from the individual ACD system of the second plurality, other than the rejection of the communication of the second type from the third ACD system, the communications network rerouting the individual communication, other than the communication of the second type, to a particular one of the second plurality of ACD systems which is identified in the communications network as an alternative destination for the individual communication rejected by the individual ACD system of the second plurality, other than for the communication of the second type rejected by the third ACD system, and further in response to receiving the rejection of the individual communication of the second type from the third ACD system, the communications network rerouting the individual communication of the second type to a particular one of the first plurality of ACD systems which is identified in the communications network as an alternative destination for the individual communication of the second type rejected by the third ACD system.

\* \* \* \* \*